US012663529B2

(12) United States Patent
Dougherty et al.

(10) Patent No.: US 12,663,529 B2
(45) Date of Patent: Jun. 23, 2026

(54) RADAR APPARATUS AND METHODS FOR DETERMINING THE PRESENCE OF A REFLECTIVE TARGET USING A MULTIPLE RESPONSE COMPARISON

(71) Applicant: SRC, Inc., North Syracuse, NY (US)

(72) Inventors: John C. Dougherty, Liverpool, NY (US); David L. Weldum, Jamesville, NY (US)

(73) Assignee: SRC, INC., North Syracuse, NY (US)

( * ) Notice: Subject to any disclaimer, the term of this patent is extended or adjusted under 35 U.S.C. 154(b) by 239 days.

(21) Appl. No.: 17/565,701

(22) Filed: Dec. 30, 2021

(65) Prior Publication Data

US 2023/0213638 A1     Jul. 6, 2023

(51) Int. Cl.
*G01S 13/04*       (2006.01)
*G01S 7/41*        (2006.01)

(52) U.S. Cl.
CPC .............. *G01S 13/04* (2013.01); *G01S 7/412* (2013.01); *G01S 7/414* (2013.01)

(58) Field of Classification Search
None
See application file for complete search history.

(56) References Cited

U.S. PATENT DOCUMENTS

| | | | | | |
|---|---|---|---|---|---|
| 4,381,509 | A | * | 4/1983 | Rotman ................. | H01Q 3/245 |
| | | | | | 343/754 |
| 5,473,333 | A | * | 12/1995 | Chiba .................... | H01Q 25/00 |
| | | | | | 342/378 |
| 2017/0115385 | A1 | * | 4/2017 | Di Palma ................ | H01Q 3/46 |
| 2019/0219661 | A1 | * | 7/2019 | Maynard ............ | G01S 5/02213 |

FOREIGN PATENT DOCUMENTS

JP      H0511043 A  *  1/1993

* cited by examiner

*Primary Examiner* — Resha Desai
*Assistant Examiner* — Brandon James Henson
(74) *Attorney, Agent, or Firm* — BOND, SCHOENECK & KING, PLLC; Jonathan L. Gray

(57)           ABSTRACT

A method of processing radar responses of a radar system characterized by a plurality of beam patterns, to determine if a given response corresponds to a reflective object. The method including, for a first beam pattern, identifying a response at an identified angle relative to a center of the first beam pattern. Then, for a second beam pattern overlapping the first beam pattern, determining if a measured response in the second beam pattern at an angle relative to the center of the second beam pattern that corresponds to the identified angle relative to the center of the first beam pattern is within a predetermined error threshold of an anticipated response calculated using the second beam pattern and the first beam pattern. If the measured response in the second beam pattern is not within the predetermined error threshold, the first response is eliminated from display and/or further tracking.

20 Claims, 7 Drawing Sheets

RADAR APPARATUS AND METHODS FOR DETERMINING THE PRESENCE OF A REFLECTIVE TARGET USING A MULTIPLE RESPONSE COMPARISON

GOVERNMENT RIGHTS

This invention was made with government support under Contract No. W15P7T-12-D-M603 awarded by the U.S. Army. The United States Government has certain rights in the invention.

FIELD

Radar apparatus and methods for determining presence of a reflective target; and more particularly, radar systems and methods for determining presence of a reflective target using a multiple response comparison.

BACKGROUND

Radar systems include a transmitter of radio frequency (RF) energy and a receiver comprising an antenna to receive a portion of the RF energy after it has reflected from a remote object. The purpose of radar systems is to identify and display representations of select objects within an airspace on a screen for human observation, based on processing of RF energy from the transmitter that is reflected off the objects. The goal of radar systems is to display reflective objects such as airplanes and to avoid display of extraneous information as may result when RF energy is received by a radar system from something other a reflective object that reflects RF energy generated by the transmitter.

A radar system covers a selected azimuthal range (e.g., 360-degree) using a sequence of RF transmissions by the transmitter. Each transmission is paired with a corresponding period of antenna reception. Each transmission-reception pair in a time sequence is able to detect objects over a portion of the azimuthal range.

For example, each transmission-receive pair may detect over an azimuthal angular range of +/−7.5 degrees about a zero angle (commonly referred to as a beam center). A radar system's ability to receive RF energy during a given period can be described by a receive beam which specifies system sensitivity as a product, at each angle in a range of azimuthal angular values, of the transmitter energy-transmission profile at a given azimuthal angle and the receiver sensitivity at the given azimuthal angle. The shape of a combined transmit beam and receive beam as specified in sensitivity as a function of angle is referred to as a two-way beam pattern (or simply as a beam pattern). The direction of a transmission and/or reception may be controlled electronically using phase or by mechanical rotation.

During nominal operation, a radar digital signal processor will identify responses (i.e., RF receptions) that are sufficiently strong as "detections" which are then forwarded for tracking and/or display. Although the above process works well under ideal circumstances, RF interference signals within an airspace can degrade the performance of radar systems. For example, interference signals arise when a source of RF energy exists in the airspace causing the system to incorrectly identify the presence of a reflective object in the air space (i.e., causing the radar system to register a false alarm). Such false alarms result in presentation of incorrect information on a display thereby confusing an operator and/or wasting system resources as one or more non-existent or non-relevant objects is tracked by the system.

Various techniques have been used for detection and mitigation of RF interference, each having drawbacks. For example, according to one technique, prior to use, an airspace is sampled for the existence of RF interference, and the radar system or operator is signaled to avoid surveillance of certain portions of the airspace. Such a solution can be time consuming or limiting of the radar systems coverage of an air space. Additionally, such an approach may not result in complete mitigation of RF interference, since RF interference may be dynamic in nature due to a source moving within the airspace or the source generating radiation that varies, in frequency or power, faster than the sampling can occur.

Other techniques to detect and mitigate inference have involved adaptively adjusting the gain of an antenna or using a transmitter that emits RF energy having specialized waveforms. These techniques have resulted in greater complexity and have not leant themselves to relatively simple retrofitting into existing radar systems.

Accordingly, there is need for an improved technique for detection and mitigation of RF interference signals, and facilitating the determination of the presence of reflective targets.

SUMMARY

According to aspects of the present invention, detections associated with a given receive beam (or beam pattern) are validated by confirming the presence of expected signal levels associated with a second receive beam (or beam pattern) (i.e., during a second period of reception) thereby allowing false alarms to be removed prior to display and/or tracking. Accordingly, a response associated with a first receive beam (or beam pattern) is compared to an expected response associated with at least one other receive beam (or beam pattern) having an overlapping region of sensitivity to determine if the reflected RF energy giving rise to the responses is from a reflective object or due to an interference signal. A receive beam (or beam pattern) is associated with a detection (or a response) if the detection (or response) occurs during the receive beam's (or beam pattern's) period of reception and in a portion of the air space in which the receive beam (or beam pattern) is sensitive.

If RF radiation received by a radar system is from a reflective object, the responses of overlapping adjacent receive beams (or beam patterns) of a radar system as they scan across the target will match the expected response, as set forth herein. However, RF radiation received from other than reflective targets will exhibit significant deviation from the expected beam response.

A first aspect of the present invention is directed to a method of processing radar responses of a radar system characterized by a plurality of beam patterns to determine if a given response corresponds to a reflective object, where each beam pattern disposed in a different azimuthal direction. The method comprises: for a first beam pattern of the plurality of beam patterns, identifying a response at an identified angle relative to a center of the first beam pattern; and for a second beam pattern of the plurality of beam patterns, the second beam pattern overlapping the first beam pattern, determining if a measured response in the second beam pattern at an angle relative to the center of the second beam pattern that corresponds to the identified angle relative to the center of the first beam pattern is within a predetermined error threshold of an anticipated response calculated using the second beam pattern and the first beam pattern. Corresponding angles are angles in different beams/beam patterns (each angle, typically, measured relative to the respective beam's beam center) that identify a same location in an airspace or substantially same location (e.g., accounting for object movement between beams or measurement error) in an airspace.

The method may, for a third beam pattern of the plurality of beam patterns that overlaps the first beam pattern, determine if a measured response in the third beam pattern at an angle relative to the center of the third beam pattern that corresponds to the identified angle relative to the center of the first beam pattern is within a predetermined error threshold of an anticipated response calculated using the third beam pattern and the first beam pattern.

In some instances, in the quality of match metric the predetermined error threshold of an anticipated response calculated using the second beam pattern and the first beam pattern and the error threshold of an anticipated response calculated using the third beam pattern and the first beam pattern are equal to one another.

The first beam pattern and the second beam pattern may be adjacent beam patterns.

In some instances, the method further comprises, before the step of identifying a response at an identified angle relative to a center of the first beam pattern, measuring a response at an angle relative to a center of an initial beam pattern, and for each of a lagging beam of the initial beam pattern and a leading beam pattern of the initial beam pattern, determining the greatest magnitude of 1) the response of the initial beam pattern, 2) the measured response in lagging beam pattern at an angle relative to the center of the lagging beam pattern that corresponds to the identified angle relative to the center of the initial beam pattern, and 3) the measured response in leading beam at an angle relative to the center of the leading beam pattern that corresponds to the identified angle relative to the center of the initial beam pattern, and designating the beam pattern having greatest magnitude as the first beam pattern.

In some instances, the method further comprises, if the measured response in the second beam pattern is within the predetermined error threshold, at least one of 1) displaying a representation of an object corresponding to the first response and 2) further tracking the first response.

In some instances, the method further comprises, if the measured response in the second beam pattern is not within the predetermined error threshold, at least one of 1) eliminating from display a representation of an object corresponding to the first response and 2) eliminating the first response from further tracking.

In some instances, the radar system is a monopulse radar system, and the step of identifying a response at an identified angle relative to a center of the first beam profile comprises measuring a first sum beam response and a first delta beam response, and the step of determining if a measured response in the second beam profile is within a predetermined error threshold of an anticipated response calculated using the second beam pattern and the first beam pattern comprises 1) determining if a measured second sum beam response in the second beam pattern at an angle relative to the center of the second beam pattern that corresponds to the identified angle relative to the center of the first beam pattern is within a predetermined sum beam error threshold of an anticipated second sum beam response calculated using the second beam pattern and the first beam pattern, and 2) determining if a measured second delta beam response in the second beam pattern at an angle relative to the center of the second beam pattern that corresponds to the identified angle relative to the center of the first beam pattern is within a predetermined delta beam error threshold of an anticipated second delta beam response calculated using the second beam pattern and the first beam pattern.

In some instances, the sum beam threshold and the delta beam threshold are equal to one another.

Another aspect of the invention is directed to a computer program stored on a non-transient storage medium and adapted to be run on a computer processor for processing radar responses of a radar system that produces a plurality of beam patterns, to determine if a given response corresponds to a reflective object, each receive beam pattern projected in a different azimuthal direction, the program comprising code comprising: for a first beam pattern of the plurality of beam patterns, identifying a response at an identified angle relative to a center of the first beam pattern; and for a second beam pattern of the plurality of beam patterns, the second beam pattern overlapping the first beam pattern, determining if a measured response in the second beam pattern at an angle relative to the center of the second beam pattern that corresponds to the identified angle relative to the center of the first beam pattern is within a predetermined error threshold of an anticipated response calculated using the second beam pattern and the first beam pattern.

In some instances, the program further comprises code to determine if the measured response in the second beam pattern is within the predetermined error threshold, and if it is to at least one of 1) display a representation of an object corresponding to the first response and 2) further track the first response.

In some instances the computer program further comprises code to determine if the measured response in the second beam pattern is within the predetermined error threshold and, if it is not, at least one of 1) eliminating from display a representation of an object corresponding to the first response and 2) eliminating the first response from further tracking.

Yet another aspect of the invention is directed to a radar system, comprising: a transmitter to produce RF energy; a receiver adapted to generate a response upon detecting RF energy, the transmitter and detector characterized by a plurality of receive beam patterns, each of the receive beam patterns extending in a different azimuthal direction; and a processor to determine if a given response from the receiver corresponds to a reflective object reflecting a portion of the RF energy produced by the transmitter, the processor programmed to: (i.) for a first beam pattern of the plurality of beam patterns, identify a response at an identified angle relative to a center of the first beam pattern; and (ii.) for a second beam pattern of the plurality of beam patterns, the second beam pattern overlapping the first beam pattern, determine if a measured response in the second beam pattern at an angle relative to the center of the second beam pattern that corresponds to the identified angle relative to the center of the first beam pattern is within a predetermined error threshold of an anticipated response calculated using the second beam pattern and the first beam pattern.

As defined herein a "computer readable storage medium" is defined as a tangible device that can retain and store instructions for use by an instruction execution device. The computer readable storage medium may be, for example, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as C++, or the like, and procedural programming languages, such as the "C" programming language or similar programming languages. Computer readable program instructions may execute entirely on the user's computer, partly on the user's computer, as a stand-alone software package, partly on the user's computer and partly on a remote computer or entirely on the remote computer or server.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or another programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that features of a method described with reference to system, may be practiced and claimed as a method or a computer program, apart from the system; and features of a method described with reference to a method may be practiced and claimed as an embodiment of a system.

These and other aspects of the present invention will become apparent upon a review of the following detailed description and the claims appended thereto.

DETAILED DESCRIPTION

The invention will be further illustrated with reference to the following specific examples. It is understood that these examples are given by way of illustration and are not meant to limit the claimed inventions to any specific embodiment.

As described in greater detail below, responses caused by a given target (i.e., an object within an airspace) in multiple beam patterns of a scanning radar (i.e., during multiple receive periods) will ideally precisely "match", where matching occurs when the responses of at least two different overlapping beam patterns occur at corresponding azimuthal angles and have corresponding amplitudes, as described in greater detail below. For a given radar detection (e.g., in a center beam pattern) under consideration, evaluating at least one response of an overlapping beam (e.g., a response of a beam pattern leading the center beam pattern in which the detection occurred or a response of a beam pattern lagging the center beam pattern in which the detection occurred) is processed to determine a "quality of match" metric.

As described in greater detail below, some amount of mismatch may be allowed. For example, mismatch may be caused by target fluctuation and/or target movement between beams of a sequence beams, and system noise. A mismatch threshold, based on a desired amount of certainty that a detection arises from a reflective object, can be used to determine whether radar responses correspond to a reflective target or RF interference.

Figure 1:
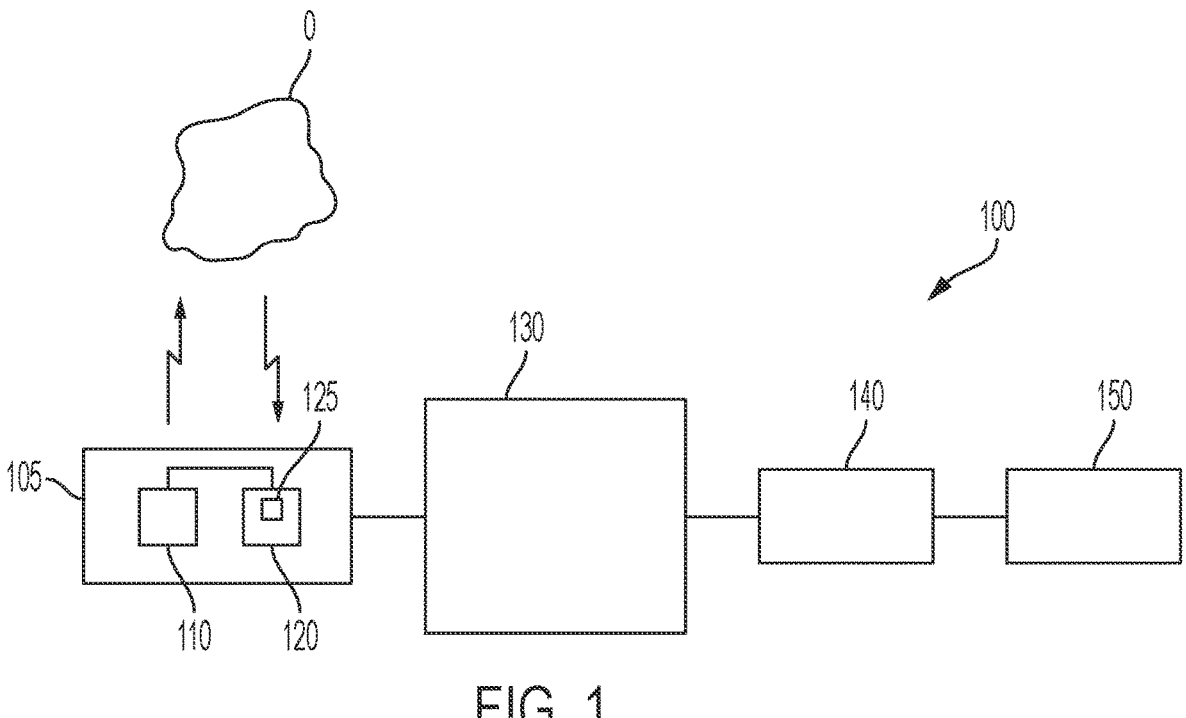
FIG. 1 is a block diagram of an example of a radar system according to aspects of the present invention.

FIG. 1 is a block diagram of an example of a radar system 100 according to aspects of the present invention, which comprises hardware 105 (e.g., a transmitter 110 and a receiver 120 comprising an antenna 125), a processor 130, a target tracker 140 and a display 150. Transmitter 110 emits radio energy as a plurality of transmit beams containing RF energy, each transmit beam projected in a different azimuthal direction, receiver 120 is responsive to RF energy and receives the RF energy from the transmitter after it is reflected from an object O and converts the energy into an electric signal. The transmitter and receiver, together, are characterized by a plurality of beam patterns, each of the beam patterns extending in a different azimuthal direction. Processor 130 is programmed to analyze the received signals as described herein below. Processor 130 identifies signal characteristics (e.g., signal strength and Doppler frequency values) and identifies the characteristics with a location in space and a time of detection.

A radar system is designed to determine, with the desired accuracy, whether there is relevant information (i.e., a flying reflective object) to be displayed. The range, azimuthal angle and elevation angle of the object can be determined using conventional techniques. According to aspects of the present invention, for a first beam pattern of the plurality of beam patterns, identifying (or measuring) a response at an identified angle relative to a center of the first beam pattern; and for a second beam pattern of the plurality of beam patterns, the second beam pattern overlapping the first beam pattern, determining if a measured response in the second beam pattern at an angle relative to the center of the second beam pattern that corresponds to the identified angle relative to the center of the first beam pattern is within a predetermined error threshold of an anticipated response calculated using the second beam pattern and the first beam pattern.

Figure 2:
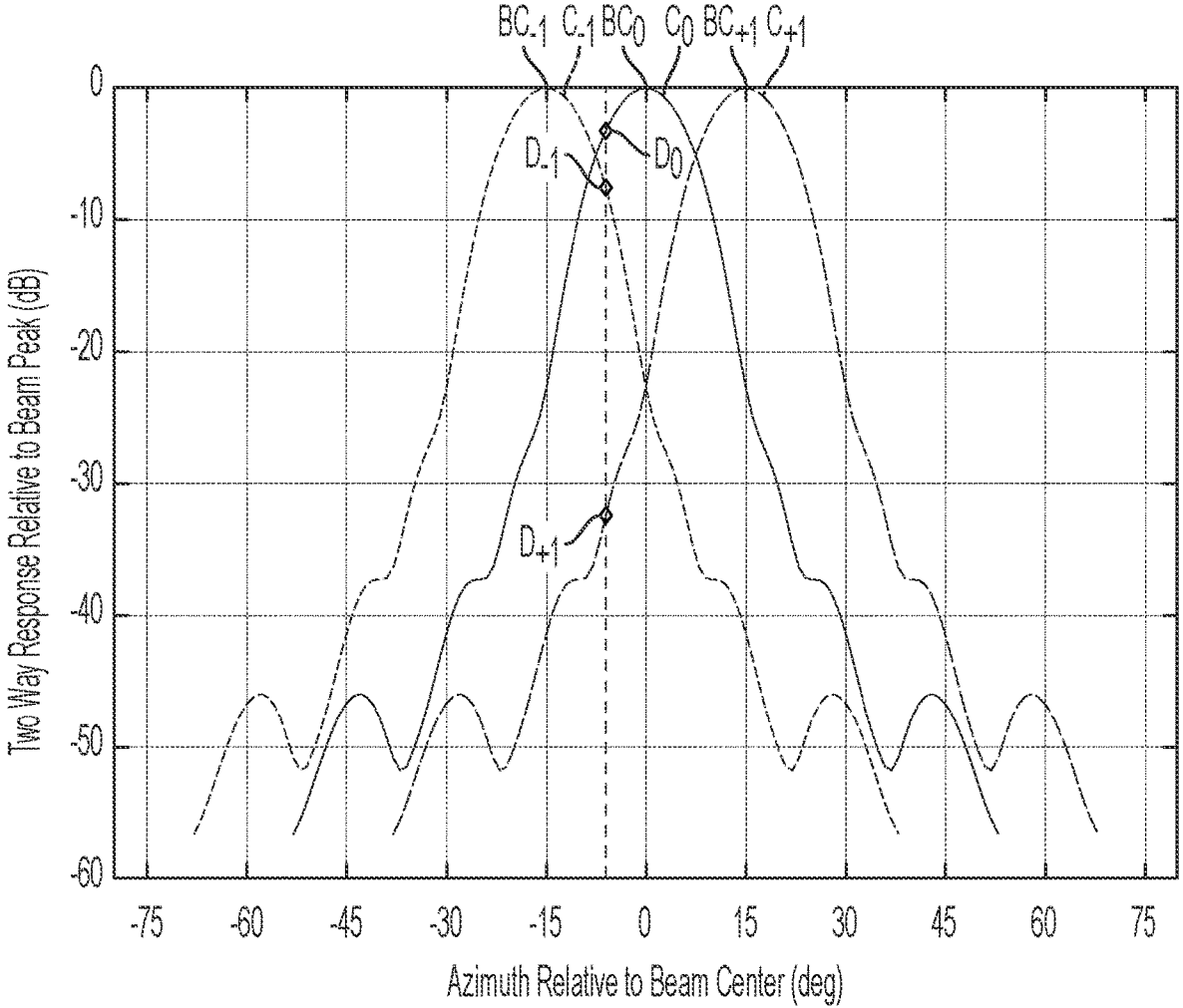
FIG. 2 is a graphical representation of an example of overlapping two-way beam patterns of a radar system, showing angular sensitivity of a radar system during multiple periods of reception.

FIG. 2 is a graphical representation of an example of three representative, overlapping beam patterns $C_0$, $C_{-1}$, $C_{+1}$ of a radar system (e.g., system 100 shown in FIG. 1) showing angular sensitivity of a radar system (such as radar system 100) during three, representative, consecutive periods of reception. Since the beam patterns are offset by 15 degrees relative to one another, assuming a 360-degree airspace, 24 beam patterns would cover the entire air space.

For beam pattern $C_0$ of the plurality of beam patterns, a response is identified and measured. To identify the detection, processor 100 (shown in FIG. 1) processes a signal from receiver 120 corresponding to first beam $C_0$ (shown in FIG. 1) to identify the response $D_0$ and to measure the amplitude of the detection (e.g., in dBs) corresponding to an object O. As described in greater detail below, the processor uses any known technique to identify the azimuth angle relative to the center $BC_0$ of the first beam. FIG. 2 illustrates that, in the illustrated example, because the beam patterns $C_{-1}$ and $C_{+1}$ are offset from beam $C_0$ by −15 degrees and +15 degrees, respectively, the location of detection $D_0$ is located at about −5 degrees relative to center $BC_0$; the location of detection $D_{-1}$ is located about +10 degrees relative to center $BC_{-1}$ (which corresponds to the identified angle relative to the center of the first beam pattern (i.e., −5 degrees), exactly); and the location of detection $D_{+1}$ is located about −20 degrees relative to center $BC_{+1}$ (which corresponds to the identified angle relative to the center of the first beam pattern (i.e., −5 degrees), exactly).

Second beam pattern $C_{-1}$ of the plurality of beam patterns that overlaps the first beam pattern $C_0$. As is apparent from FIG. 2, given the known angular location of the detection in first beam pattern $C_0$ and the known shape and relative locations of $C_0$, $C_{+1}$ and $C_{-1}$, it is possible to calculate an anticipated response $D_{-1}$ for a second beam pattern $C_{-1}$ corresponding to object O, assuming that the source of the RF energy corresponding to detection $D_0$ is, indeed, a reflective object reflecting RF energy from the transmitter 110 (shown in FIG. 1). Assuming no azimuthal movement of the object between reception periods associated with beam patterns $C_0$, $C_{-1}$, $C_{+1}$, the corresponding angles in beam patterns $C_0$, $C_{-1}$, $C_{+1}$, (as measured relative to their corresponding beam centers) are related as shown in FIG. 2; and object O that appears in first beam pattern $C_0$ as $D_0$, will appear in second beam pattern $C_{-1}$ as $D_{-1}$, and in third beam pattern $C_{+1}$ as $D_{+1}$.

It will be understood that the designations first, second and third and the designations $C_0$, $C_{-1}$, $C_{+1}$ are merely for ease of description and do not correspond to time of occurrence. Reception periods (corresponding to the various beam) will occur at different times.

Given the relationship of the angles of detections $D_0$, $D_{-1}$ relative to the beam centers of their respective beams $C_0$, $C_{-1}$ as described above, it is possible to determine if a measured response at an angle relative to the center of the second beam pattern corresponds to the identified angle relative to the center of the first beam pattern if the measured response in the second beam is within a predetermined error threshold of the anticipated response calculated using the second beam pattern. Equation 1 describes the relationship between responses within two overlapping beam patterns. In Equation 1, measured values are assumed to be represented decibels; although equivalent equations can be used where measured values are not in decibels.

If a lagging beam pattern is implemented, an anticipated-to-measured response error can be calculated for beam pattern $C_{-1}$ as follows.

$$E_{-1} = |(M_0 - M_{-1}) + (N_{-1} - N_0)| - \in \qquad \text{Equation 1}$$

where $M_0$ is the measured amplitude of the response a first detection in beam pattern $C_0$ at an identified angle;

$M_{-1}$ is the measured amplitude of the response in the beam $C_{-1}$ at the same range (and possibly Doppler frequency) as the first detection;

$N_0$ is the value along beam pattern $C_0$ at the corresponding angle relative to beam center $BC_0$;

$N_{-1}$ is the value along the beam pattern $C_{-1}$ at the corresponding a angle relative to beam center $BC_{-1}$;

$\in$ is an error threshold.

Then if error value $E_{-1} < 0$, the first detection is considered valid, if $E_{-1} > 0$, the first detection is removed from further processing and/or display.

Similarly, if a leading beam pattern is implemented, an anticipated-to-measured response error can be calculated for beam pattern $C_{+1}$.

$$E_{+1} = |(M_0 - M_{+1}) + (N_{+1} - N_0)| - \in \qquad \text{Equation 2}$$

where $M_{+1}$ is the measured amplitude of the response in the beam $C_{-1}$ at the same range (and possibly Doppler frequency) as the first detection $N_{+1}$ is the value along the beam pattern $C_{-1}$ at the corresponding a angle relative to beam center $BC_{-1}$;

Then if error value $E_{+1} < 0$, the first detection is considered valid, if $E_{+1} > 0$, the first detection is removed from further processing and/or display.

It is to be appreciated that, if a detection by radar system 100 (shown in FIG. 1) were to arise as a result of RF energy received by receiver 120 that is not from an object reflecting RF energy from transmitter 110 (shown in FIG. 1), the responses in beam patterns $C_0$, $C_{-1}$, $C_{+1}$ would not be related by values of beam patterns at corresponding angles.

In some instances, the receive beam pattern magnitude values are stored in a look-up-table as a function of azimuthal angle, thereby allowing values of $N_{-1}$, $N_0$, $N_{+1}$ to be accessed and used for the above calculations.

While the amplitude of the response in the second beam could be precisely calculated if the generation, transmission and reflection of RF energy were constant (i.e., which would allow for an error threshold equal to 0 (where measured values are in decibels)), some variation in generation, transmission and reflection of RF energy during the period of the first beam and the period of the second beam can be expected. For example, some movement of the object relative to the radar system between the period of the first beam and the period of the second beam can be expected and/or some variation in the efficiency of transmission of RF energy through the environment may occur. Accordingly, an error threshold is used.

According to aspects of the present invention, if a given detection is not within the threshold difference, the detection will be eliminated from tracking and/or eliminated from display. Accordingly, it will be appreciated that setting of a threshold is based on expected variations between periods of reception associated with the beam patterns, and based on relative impact of the occurrence of false alarms and the impact of the occurrence of failures to display a relevant target.

Additionally, although FIG. 2 shows a detection occurring in three beam patterns, techniques according to aspects of the present invention can be used if there is overlap between two or more beam patterns. An error threshold may be common between all overlapping beams or uniquely set for any pair or all pairs of overlapping beams. Additionally, although two overlapping beam patterns to be used to confirm the presence of a reflective target are typically adjacent beam patterns (i.e., immediate neighbors in azimuthal angle) non-adjacent beam patterns can be used.

It is understood that a radar system can collect signal information corresponding to numerous radial distance distances and numerous Doppler frequency values. In choosing signals for analysis of a detection according to aspects of the present invention, signals corresponding to same or similar values radial distances and Doppler frequencies are typically used.

The calculations made according to aspects of the present invention are typically performed in real time; however, processing of a received signal may occur several receive periods after the signal is detected by a receiver. The order in which signals corresponding to receive beams are processed is typically not critical. In some instances it is advantageous that, when a detection is identified at a particular angle relative to a beam center, that corresponding angles of lagging and leading signals are analyzed to identify which signal contains the response of highest amplitude and the beam pattern containing the response of highest amplitude is processed as the first beam pattern (also referred to as a center beam pattern $C_0$) according to the process set forth above; however, any order of processing of the signals may be used.

Figures 3, 4:
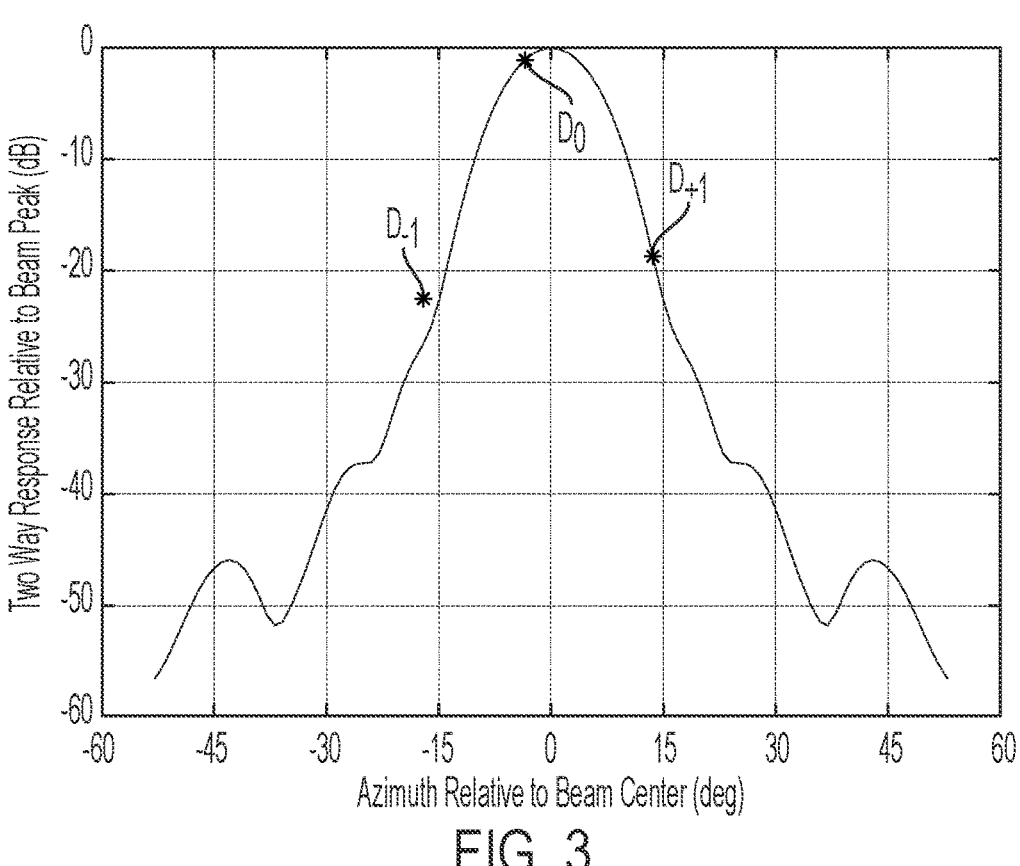
FIG. 3 is a graphical representation of a single one of the two-way beam patterns show in FIG. 2 having illustrated thereon a response of a center beam and the responses of two overlapping beam patterns located on opposing sides of the beam center.
FIG. 4 is a graphical representation of a single one of the two-way beam patterns show in FIG. 2 having illustrated thereon a response of a center beam and the responses of two adjacent beam patterns located on a same side of the beam center.

FIG. 3 is a graphical representation of one of the beam patterns shown in FIG. 2 having illustrated thereon a response of a center-beam and the responses of two overlapping beam patterns located on opposing sides of the beam center. In FIG. 3 all of the detection amplitude values have been located onto a single beam pattern to facilitate visualization of the degree to which the data from the three beam patterns $C_0$, $C_{-1}$, $C_{+1}$ match the expected beam pattern. Ideally, all detection amplitudes would be located precisely on the beam pattern, thereby indicating a high degree of certainty that that the detections arise from a reflective object in the airspace that should be displayed and tracked by the radar system. As indicated above, some deviation of the responses from the beam pattern is typically acceptable and desirable to account for sources of variation as identified above. As will be understood, the degree to which variation is allowed while still forwarding a response for display and tracking is specified by error factor E in Equation 1.

FIG. 4 is a graphical representation of another example of response shown on a single one of the beam patterns show in FIG. 2 where the beam pattern has illustrated thereon a response of a center-beam and the responses of two adjacent beam patterns located on a same side of the beam center. For example, an instance of two detections on one side of the beam center and no detection on the opposite side may arise when processing is interrupted to perform duties, such as dedicated tracking of a target, or for diagnostic performance and fault monitoring.

Figure 5:
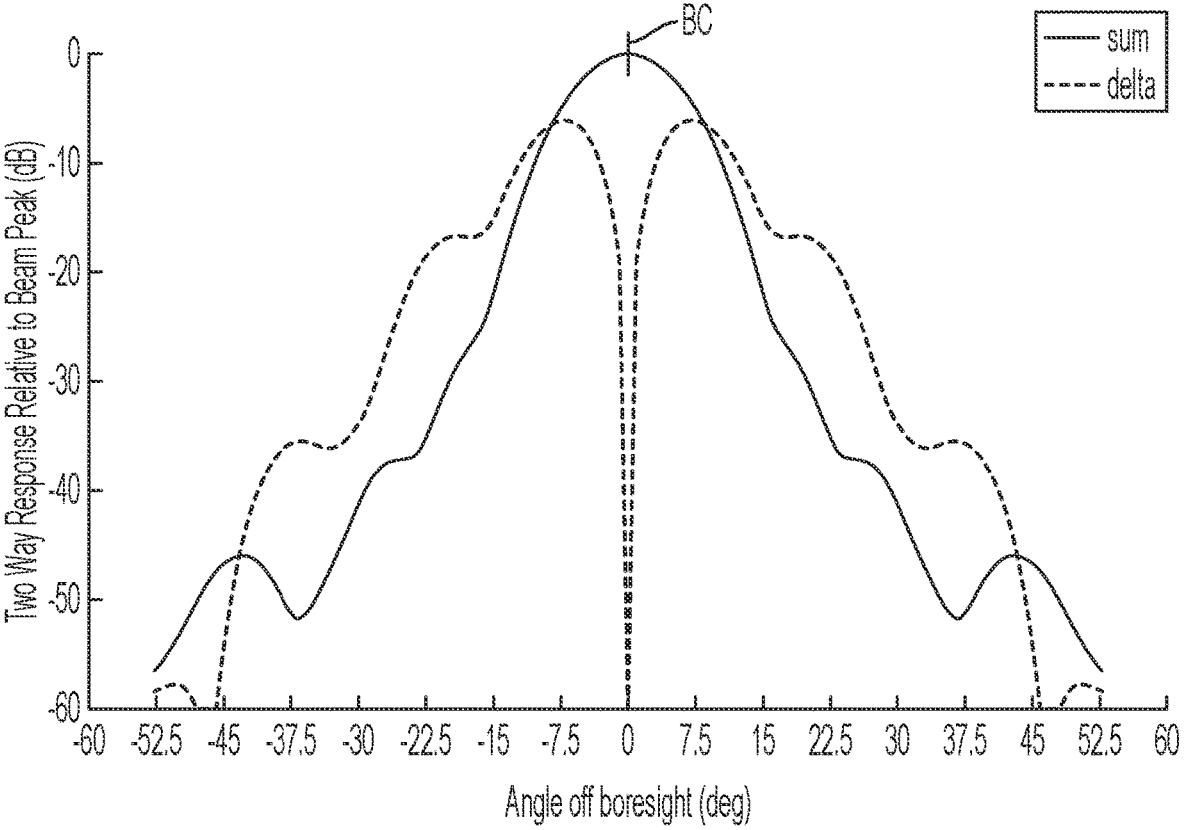
FIG. 5 is a graphical representation of an example of an angular sensitivity of a sum beam and an angular sensitivity of a delta beam of a monopulse radar system.

Monopulse radar systems are in common usage and it is well understood in the art that such systems give rise to two simultaneous signal level measurements for a given object: one using a component of the beam pattern referred to as a sum beam and another using a component of the beam pattern referred to as a delta beam. FIG. 5 is a graphical representation of an example beam pattern and corresponding angular sensitivities of a sum beam and a delta beam of a monopulse radar receiver. It will be appreciated that the presence of two simultaneous responses allows for identification of an azimuthal angle within a given beam pattern and allows for the use of quality of match metric including terms based on deviation from an anticipated sum beam response and an anticipated delta beam response. In some instances, only one response of a monpulse radar system used to determine the presence of an object as set forth herein; typically, in such instances, the delta response is used due to the delta beams wider beam pattern.

Figure 6:
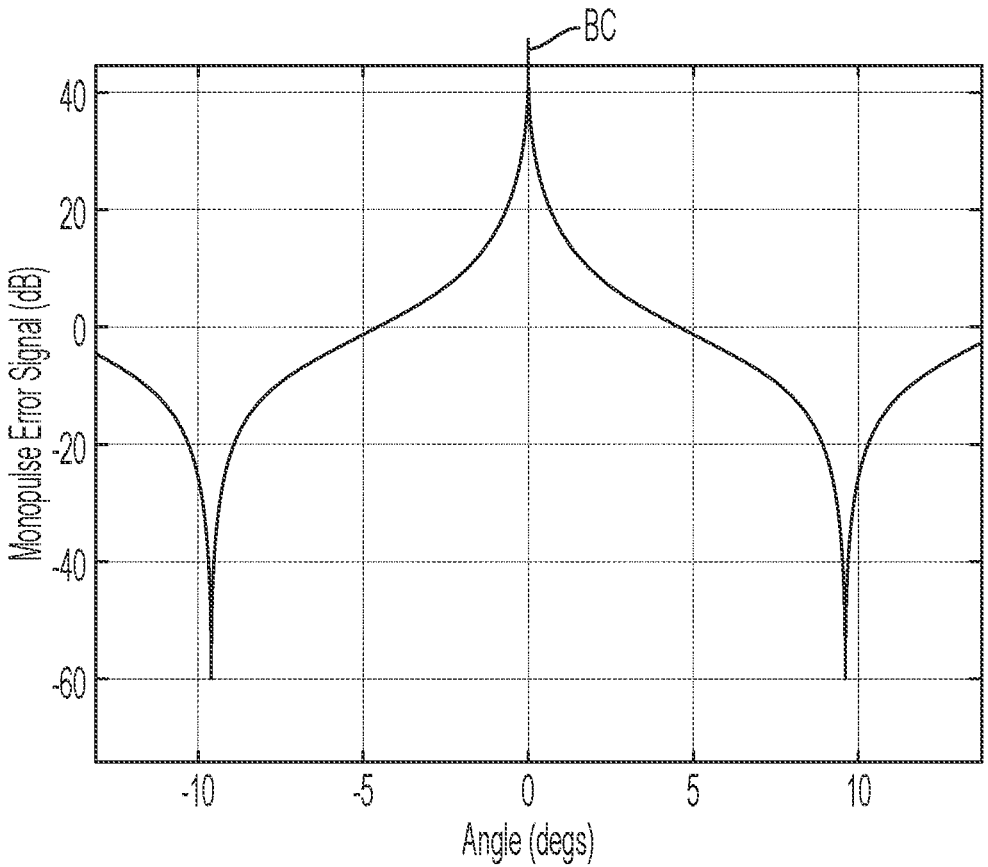
FIG. 6 is a graphical representation of a ratio of a sum beam sensitivity and a delta beam sensitivity of a monopulse radar system, the ratio shown as a function of angle.

FIG. 6 is a graphical representation of a ratio of the sum beam sensitivity and the delta beam sensitivity of example of FIG. 5, as a function of angle. To identify an angular location of detection using a given beam pattern, an a priori knowledge of the relative values of sum beam sensitivity and the delta beam sensitivity as a function of angle can be used. As is apparent from FIG. 6, a given value of the ratio of the sum beam response to the delta beam response the angular location corresponds to one of two possible angles, the angular locations being symmetric about beam center BC. As is known in the art, the phases of the measured signals can be used to discern whether the object is on the positive azimuth side or the negative azimuth side of the center beam thereby identifying a single angle corresponding to the detection. Accordingly, by determining a ratio of a measured sum beam response and a measured delta beam response, and determining the phases of the detected sum beam and the delta beam, a unique angular position within a beam pattern can be determined. Although determination of an angular position has been described with the use of a monopulse system, any suitable technique for a given type of radar system can be used to determine angular position, such as maximum likelihood or sequential lobing.

Figure 7:
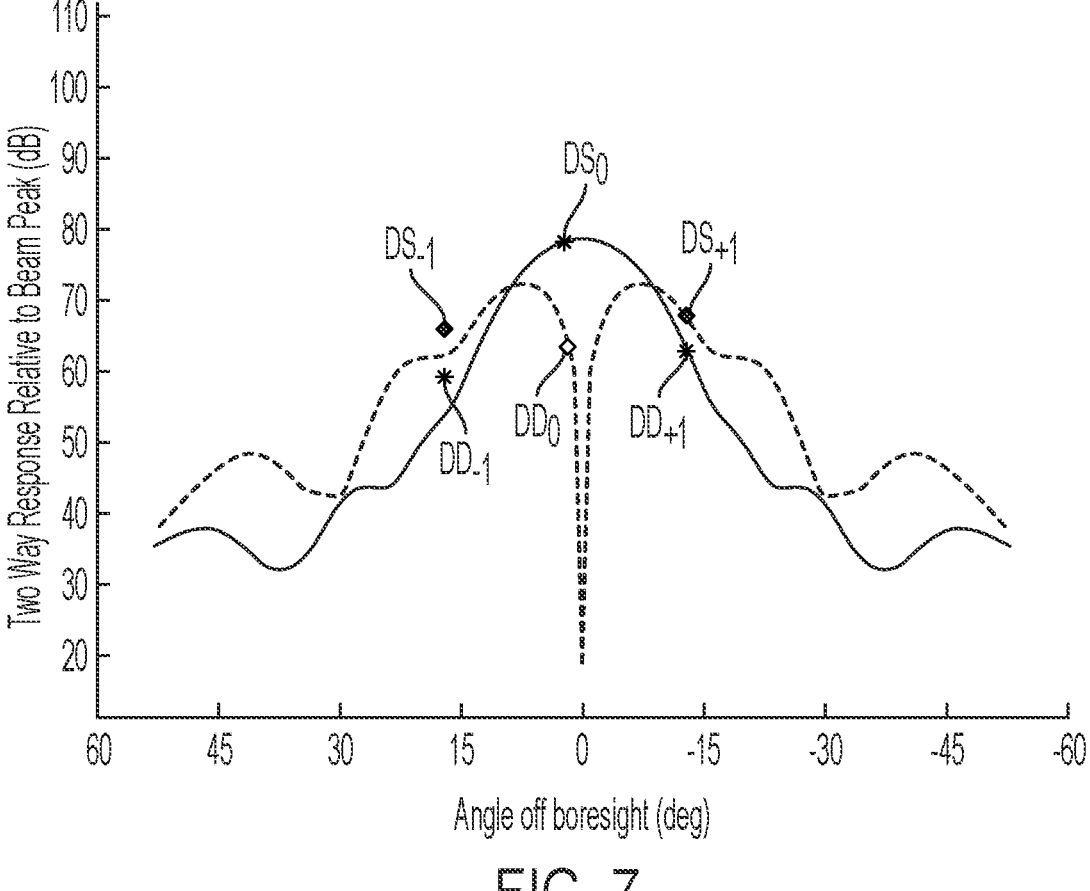
FIG. 7 is the graphical representation of angular sensitivity of a sum beam and angular sensitivity of a delta beam of a single monopulse beam pattern, and including a value of a sum beam response and a delta beam response for each of a center beam and two adjacent beam patterns located on opposing sides of the beam center.

FIG. 7 is the graphical representation of a sum beam and delta beam of a single monopulse beam pattern, and including a value of a sum beam response and a delta beam response for each of a center beam and for each of the two adjacent beam patterns located on opposing sides of the beam center. FIG. 7 is similar to FIG. 3; however, in FIG. 7, for each detection, data exists and is illustrated for both a sum beam response and delta beam response. Accordingly, a "quality of match" metric for a monopulse radar system can include both a sum beam components and a delta beam components to establish the presence of a reflective object. The sum beam component and delta beam component can be processed to determine a match using a same or a different error threshold in determining whether an object is a to be displayed and tracked.

Figure 8:
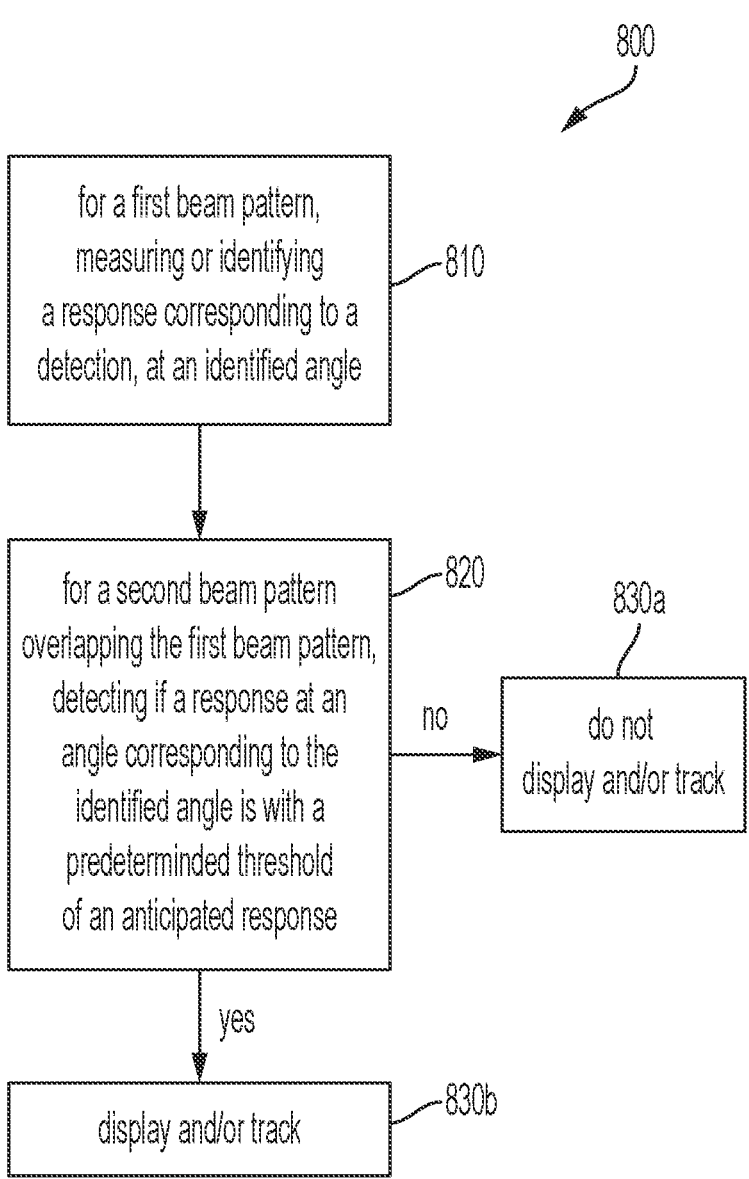
FIG. 8 is a flowchart showing a method of determining the presence of a target within an airspace of a radar system, and taking a corresponding action.

FIG. 8 is a flowchart showing a method 800 of determining the presence of a target within an airspace of a radar system, and taking a corresponding action. At step 810, for a first beam of the plurality of receive beams, a response at an identified angle relative to a center of the first beam pattern is identified.

At step 820, for a second beam pattern of the plurality of receive beam patterns having a two-way beam pattern that overlaps a two-way beam pattern of the first beam, it is determined whether a measured response in the second beam pattern at an angle relative to the center of the second beam pattern that corresponds to the identified angle relative to the center of the first beam pattern is within a predetermined error threshold of an anticipated response calculated using the second beam pattern and the first beam pattern.

At step 830*a*, if the measured response in the second bam is within the predetermined threshold, a target corresponding to the response in the first beam pattern is displayed on a screen and/or further tracked. And at step 830*b*, if the measured response in the second beam pattern is not within the predetermined threshold, a target corresponding to the response in the first beam pattern is not displayed on a screen and/or not further tracked.

Although various embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed:

1. A method of processing radar responses of a radar system characterized by a plurality of beam patterns, to determine if a given response corresponds to a reflective object, each beam pattern disposed in a different azimuthal direction, the method comprising:

for a first beam pattern of the plurality of beam patterns, identifying a first response at an identified angle relative to a center of the first beam pattern;

calculating an anticipated response for a second beam pattern of the plurality of beam patterns, the second beam pattern overlapping the first beam pattern, the anticipated response representing the response expected in the second beam pattern if the first response corresponds to a reflective object; and determining that the first response corresponds to a reflective object if a measured response in the second beam pattern at an angle relative to the center of the second beam pattern that corresponds to the identified angle relative to the center of the first beam pattern is within a predetermined error threshold of the anticipated response, wherein the anticipated response includes an anticipated sum beam response and an anticipated delta beam response, the predetermined error threshold comprises a quality of match metric including terms based on deviation of a sum beam response of the second beam pattern from the anticipated sum beam response and deviation of a delta beam response of the second beam pattern from the anticipated delta beam response.

2. The method of claim 1 wherein, for a third beam pattern of the plurality of beam patterns that overlaps the first beam pattern, determining if a measured response in the third beam pattern at an angle relative to the center of the third beam pattern that corresponds to the identified angle relative to the center of the first beam pattern is within a second predetermined error threshold of a second anticipated response, the second anticipated response representing the response expected in the third beam pattern if the first response corresponds to a reflective object.

3. The method of claim 2, wherein the predetermined error threshold is equal to the second predetermined error threshold.

4. The method of claim 1, wherein the first beam pattern and the second beam pattern are adjacent beam patterns.

5. The method of claim 1, further comprising, before the step of identifying a response at an identified angle relative to a center of the first beam pattern, measuring a response at an angle relative to a center of an initial beam pattern, and for each of a lagging beam of the initial beam pattern and a leading beam pattern of the initial beam pattern, determining the greatest magnitude of 1) The response of the initial beam pattern, 2) The measured response in lagging beam pattern at an angle relative to the center of the lagging beam pattern that corresponds to the identified angle relative to the center of the initial beam pattern, and 3) The measured response in leading beam at an angle relative to the center of the leading beam pattern that corresponds to the identified angle relative to the center of the initial beam pattern, and designating the beam pattern having greatest magnitude as the first beam pattern.

6. The method of claim 1 further comprising, if the measured response in the second beam pattern is within the predetermined error threshold, at least one of 1) displaying a representation of an object corresponding to the first response and 2) tracking the first response.

7. The method of claim 1 further comprising, if the measured response in the second beam pattern is not within the predetermined error threshold, at least one of 1) eliminating from display a representation of an object corresponding to the first response and 2) eliminating the first response from tracking.

8. The method of claim 1, wherein the radar system is a monopulse radar system, and wherein the step of identifying a response at an identified angle relative to a center of the first beam pattern comprises measuring a first sum beam response and a first delta beam response, and wherein the step of determining if a measured response in the second beam pattern is within a predetermined error threshold of an anticipated response calculated using the second beam pattern and the first beam pattern comprises 1) determining if a measured second sum beam response in the second beam pattern at an angle relative to the center of the second beam pattern that corresponds to the identified angle relative to the center of the first beam pattern is within a predetermined sum beam error threshold of an anticipated second sum beam response calculated using the second beam pattern and the first beam pattern, and 2) determining if a measured second delta beam response in the second beam pattern at an angle relative to the center of the second beam pattern that corresponds to the identified angle relative to the center of the first beam pattern is within a predetermined delta beam error threshold of an anticipated second delta beam response calculated using the second beam pattern and the first beam pattern.

9. The method of claim 8, wherein the sum beam threshold and the delta beam threshold are equal to one another.

10. A non-transitory storage medium storing program code adapted to be run on a computer processor for processing radar responses of a radar system that produces a plurality of beam patterns, to determine if a given response corresponds to a reflective object, each receive beam pattern projected in a different azimuthal direction, the program code comprising:

for a first beam pattern of the plurality of beam patterns, identifying a first response at an identified angle relative to a center of the first beam pattern;

calculating an anticipated response for a second beam pattern of the plurality of beam patterns, the second beam pattern overlapping the first beam pattern, the anticipated response representing the response expected in the second beam pattern if the first response corresponds to a reflective object; and determining that the first response corresponds to a reflective object if a measured response in the second beam pattern at an angle relative to the center of the second beam pattern that corresponds to the identified angle relative to the center of the first beam pattern is within a predetermined error threshold of the anticipated response, wherein the anticipated response includes an anticipated sum beam response and an anticipated delta beam response, the predetermined error threshold comprises a quality of match metric including terms based on deviation from the anticipated sum beam response and the anticipated delta beam response.

11. The non-transitory storage medium of claim 10, further storing program code comprising determining if the measured response in the second beam pattern is within the predetermined error threshold, and performing at least one of 1) displaying a representation of an object corresponding to the first response and 2) tracking the first response.

12. The non-transitory storage medium of claim 10, further storing program code comprising determining if the measured response in the second beam pattern is not within the predetermined error threshold, and at performing least one of 1) eliminating from display a representation of an object corresponding to the first response and 2) eliminating the first response from tracking.

13. The non-transitory storage medium of claim 10 further storing program code comprising, for a third beam pattern of the plurality of beam patterns that overlaps the first beam pattern, determining if a measured response in the third beam pattern at an angle relative to the center of the third beam pattern that corresponds to the identified angle relative to the center of the first beam pattern is within a predetermined error threshold of a second anticipated response, the second anticipated response representing the response expected in the third beam pattern if the first response corresponds to a reflective object.

14. The non-transitory storage medium storing program code of claim 13, wherein the predetermined error threshold is equal to the second predetermined error threshold.

15. The non-transitory storage medium storing program code of claim 10, wherein the first beam pattern and the second beam pattern are adjacent beam patterns.

16. A radar system, comprising:

a transmitter to produce RF energy;

a receiver adapted to generate a response upon detecting RF energy, the transmitter and detector characterized by a plurality of receive beam patterns, each of the receive beam patterns extending in a different azimuthal direction; and a processor to determine if a given response from the receiver corresponds to a reflective object reflecting a portion of the RF energy produced by the transmitter, the processor programmed to:

(i.) for a first beam pattern of the plurality of beam patterns, identify a first response at an identified angle relative to a center of the first beam pattern;

(ii.)

(ii.) calculating an anticipated response for a second beam pattern of the plurality of beam patterns, the second beam pattern overlapping the first beam pattern, the anticipated response representing the response expected in the second beam pattern if the first response corresponds to a reflective object; and determining that the first response corresponds to a reflective object if a measured response in the second beam pattern at an angle relative to the center of the second beam pattern that corresponds to the identified angle relative to the center of the first beam pattern is within a predetermined error threshold of the anticipated response, wherein the anticipated response includes an anticipated sum beam response and an anticipated delta beam response, the predetermined error threshold comprises a quality of match metric including terms based on deviation from the anticipated sum beam response and the anticipated delta beam response.

17. The radar system of claim 16, wherein the processor is further programmed to determine if the measured response in the second beam pattern is within the predetermined error threshold, and at least one of 1) display a representation of an object corresponding to the first response and 2) track the first response.

18. The radar system of claim 16, wherein the processor is further programmed to determine if the measured response in the second beam pattern is not within the predetermined error threshold, and at least one of 1) eliminate from display a representation of an object corresponding to the first response and 2) eliminate the first response from tracking.

19. The radar system of claim 16, wherein the processor is further programmed to, for a third beam pattern of the plurality of beam patterns that overlaps the first beam pattern, determine if a measured response in the third beam pattern at an angle relative to the center of the third beam pattern that corresponds to the identified angle relative to the center of the first beam pattern is within a second predetermined error threshold of a second anticipated response, the second anticipated response representing the response expected in the third beam pattern if the first response corresponds to a reflective object.

20. The radar system of claim 16, wherein the first beam pattern and the second beam pattern are adjacent beam patterns.

\* \* \* \* \*